United States Patent [19]
Yorston et al.

[11] Patent Number: 5,957,228
[45] Date of Patent: Sep. 28, 1999

[54] CUTTING ELEMENT WITH A NON-PLANAR, NON-LINEAR INTERFACE

[75] Inventors: John Barry Yorston, Mendham; Deepthi Raj Setlur, Cliffwood, both of N.J.

[73] Assignee: Smith International, Inc., Houston, Tex.

[21] Appl. No.: 08/922,038

[22] Filed: Sep. 2, 1997

[51] Int. Cl.$^6$ .................................................. E21B 10/46
[52] U.S. Cl. ........................................ 175/430; 175/431
[58] Field of Search .................................. 175/339, 376, 175/378, 393, 430, 431; 451/551

[56] References Cited

U.S. PATENT DOCUMENTS

| | | | |
|---|---|---|---|
| 4,460,053 | 7/1984 | Jürgens et al. | 175/430 |
| 4,577,706 | 3/1986 | Barr | 175/430 |
| 4,604,106 | 8/1986 | Hall | 51/293 |
| 4,629,373 | 12/1986 | Hall | 407/118 |
| 5,120,327 | 6/1992 | Dennis | 51/293 |
| 5,282,513 | 2/1994 | Jones | 175/430 X |
| 5,351,772 | 10/1994 | Smith | 175/428 |
| 5,355,969 | 10/1994 | Hardy et al. | 175/432 |
| 5,379,854 | 1/1995 | Dennis | 175/434 |
| 5,484,330 | 1/1996 | Flood et al. | 451/540 |
| 5,544,713 | 8/1996 | Dennis | 175/434 |
| 5,564,511 | 10/1996 | Frushour | 175/431 |
| 5,590,728 | 1/1997 | Matthias et al. | 175/432 |
| 5,598,750 | 2/1997 | Griffin et al. | 76/108 |
| 5,617,928 | 4/1997 | Matthias et al. | 175/432 |
| 5,622,233 | 4/1997 | Griffin | 175/432 |
| 5,706,906 | 1/1998 | Jurewicz et al. | 175/428 |
| 5,709,279 | 1/1998 | Dennis | 175/430 |
| 5,711,702 | 1/1998 | Devlin | 451/540 |

FOREIGN PATENT DOCUMENTS

| | | |
|---|---|---|
| 0 655 549 A1 | 5/1995 | European Pat. Off. . |
| 0 687 797 A1 | 12/1995 | European Pat. Off. . |
| 0 688 937 A1 | 12/1995 | European Pat. Off. . |

*Primary Examiner*—Frank Tsay
*Attorney, Agent, or Firm*—Fish & Richardson P.C.

[57] ABSTRACT

A cutting element has a substrate with a non-planar, non-linear surface bonded to a superhard element. The substrate provides one or more non-linear grooves radially mounted in spaced relationships on the surface of the substrate. Each groove has a generally curved shape that unfurls from a first circle on the substrate towards a perimeter of the substrate. The groove shape is defined by complex functions, examples of which include high order polynomials and involutes. The depth and width of the groove varies, generally in an increasing manner, along the path from the first circle towards the substrate perimeter. Further, the pitch of the groove also varies along the path from the first circle towards the substrate perimeter.

22 Claims, 12 Drawing Sheets

CUTTING ELEMENT WITH A NON-PLANAR, NON-LINEAR INTERFACE

BACKGROUND

The present invention relates to cutting elements with non-planar interfaces and, more specifically, to cutting elements with non-planar, non-linear interfaces.

Industrial applications such as subterranean drilling, cutting, machining, milling, grinding, and other abrasive operations require tools with high abrasion resistance and impact resistance. In these instances, abrasive compacts designed specifically to provide needed abrasion and impact resistance are deployed. Each abrasive compact typically has an abrasive layer of sintered polycrystalline diamond, wherein the polycrystalline diamond layer is created by subjecting a mass of individual crystals to high pressure and temperature processes or to chemical vapor deposition processes or physical vapor deposition such that intra-crystalline bonding occurs. These abrasive compacts are thus called polycrystalline diamond (PCD) compacts.

Each PCD compact is a coherent, polycrystalline hard composite having a substrate, or mounting layer, and a table made of a superhard abrasive layer. The substrate or mounting layer is typically a metal carbide substrate, while the superhard abrasive layer is made from synthetic or natural diamond, cubic boron nitride (CBN), wurzite boron nitrite, or combinations thereof. The abrasive layer and the substrate are bonded together using a process known as sintering, or sintered bonding, as known to those skilled in the art. The resulting PCD compact is subsequently mounted to a bit body for use with drilling equipment.

The sintering of the substrate to the polycrystalline material occurs under a temperature that is in excess of 1,300° C. After cooling down from the bonding temperature, the substrate may shrink faster than the polycrystalline material layer due to differences in coefficients of thermal expansion. The differential shrinkage leads to residual shear stresses between the substrate and the PCD layer. As such, thermally-induced stresses are introduced between the substrate and the polycrystalline material, leading to a reduction in the bond strength. In addition, tensile stresses may be introduced in localized regions in an outer cylindrical surface of the substrate and internally in the substrate.

Further, during use, impact forces may release stress in the form of fractures in the compact. As a result, the abrasive layer may spall and/or delaminate, causing a potential separation and loss of the diamond or other superhard material on a cutting surface. These failure modes are likely to lead to instability and, ultimately, a complete failure of the PCD element.

A number of cutter configurations have been developed to overcome the aforementioned problems. To improve the bond between the superhard material and the substrate, certain cutting elements have modified the shape of the superhard material and substrate interface from a traditional planar configuration to a configuration that provides mechanical interlocks between the superhard material and the substrate. Attempts to increase the performance of the cutting elements have also focused on applying a non-planar interface (NPI) geometry such as a ridge to increase the interfacial area between the superhard material and the substrate. The presence of the ridge improves the bonding between the table and the substrate by accommodating a distortion which results from a heating of the cutting assembly during the formation as well as a subsequent bonding of the cutting element onto a carrier. Such distortion results from a difference in coefficients of thermal expansion and moduli of elasticity between the superhard material of the facing table and the less hard material of the substrate.

Yet other NPI cutting elements employ one or more constant cross-sectional grooves or channels on the abrasive layer that communicate with their counterparts on the substrate. However, the use of parallel grooves at the interface as a mechanical interlock is not ideal, because although parallel ridges or similar perturbations create surfaces that have symmetry in cross-sections, they are not symmetrical about a central axis. This in turn requires a correct orientation of the cutter in the drill bit in order to realize the improved mechanical interlocking feature.

Other NPI cutting elements provide sinusoidal-like grooves that run perpendicular to a longitudinal axis of the cutting element. Yet other NPI cutting elements provide grooves that run radially to or in a circular fashion about the longitudinal axis of the cutting element. Further, certain NPI cutting elements position concentric annular rings that expand outwardly from the center of the interface to increase the bonding surface area. The increase in volume of the superhard material at the bonding location increases the wear life of the compact. The resistance to impacts is also improved by providing greater bonding strength between the superhard material and the abrasive layer.

Additionally, other cutting elements use a curved or a domed interface to increase the bonding strength between the superhard material and the substrate. The domed interface, by virtue of its geometry, also increases the volume of the superhard material available for abrasive tasks. However, even with NPI cutting elements, the spalling and delamination of the cutting element still exist. Such failures in the cutting element may necessitate a retooling of the drill bit in the field. When down-time, labor cost and replacement costs are considered, such failures are undesirable, especially in the case of deep-well and off-shore drilling applications.

SUMMARY OF THE INVENTION

A cutting element has generally planar base having a surface on the base and a first set of non-planar, non-linear grooves concentrically formed on the surface. The substrate with the non-planar, non-linear grooves has an asymmetrical cross section. Each groove has a generally curved shape formed from a non-linear wall. The groove unfurls from a center of the substrate toward a perimeter of the substrate.

In another aspect, blades are formed by grooves cut on the surface of the substrate. The blades are divided into two groups, one group having apexes of grooves that form the blades positioned on a first circle concentric with a center of the element. A second group having apexes of grooves that form the blades positioned on a second circle which is concentric with the first circle.

In another aspect, the grooves follow paths that radiate outward either from a center point, or offset from the center, to meet a circle about the center of the substrate. The profiles of the grooves follow non-linear curves defined by complex functions, examples of which include high-order polynomials and involutes. The paths of the grooves also follow curves defined by a set of complex functions in 3-D space. The depth and width of the groove varies, generally in an increasing manner, along the path from the first circle toward the substrate perimeter. Further, the pitch of the groove also varies along the path from the first circle towards the substrate perimeter.

In another aspect, the region from the center of the substrate surface, up to the perimeter, has a curvature that is yet another complex function. The top of the grooves have fillets that remove all sharp edges from the non-linear surface. The resulting structure is a capped substrate with alternating non-linear grooves flowing downwardly from the top of the substrate.

In yet another aspect, the non-planar interface (NPI) non-linear interface (NLI) grooves have cross sections that vary in width, depth, and pitch. Moreover, the cross-sections of the NPI-NLI grooves are non-symmetrical.

Advantages of the invention may include one or more of the following. Stress concentrations in the cutting element are reduced by virtue of an absence of discrete cleavage planes and lines, thereby improving the strength of the cutting element in severe impact applications. Additionally, the cutting element geometry reduces crack propagation due to the absence of discrete cleavage planes and lines. Moreover, residual stress concentrations are reduced in comparison with conventional elements having linear radial lines and planes. The stress reduction is achieved by dissipating inherent mismatches in elastic and thermal properties of the diamond table and substrate over the greatest possible area. Moreover, the NLI PCD cutter allows for independent variations in the width and the depth of the groove to better control residual stress properties of the manufactured cutter. Step type transitions in material properties are removed, thereby reducing stress concentrations. Moreover, a diffusion front of materials used during liquid phase sintering becomes more uniform by virtue of the removal of step-type transitions in the interface geometry. The NLI profile of the cutting element distributes residual stresses caused by inherent differences in material properties more evenly and over a larger surface. Hence, the non-linear interfacial surface also reduces shear stress as applied to the interface during use. Additionally, the enhanced mechanical interlocking enhances the stability and the performance of the cutting element, resulting in a high resistance to impacts during the drilling cycle and therefore translates into a longer bit life. Furthermore, the symmetry of the cutting element about its center alleviates the need for a proper orientation of the cutting element during its assembly into a drill bit. Additionally, the increased surface area allows a thick superhard layer such as the PCD layer to be provided toward the perimeter of the element to increase a durability of the cutting element.

DESCRIPTION OF THE DRAWINGS

The invention will become apparent from a consideration of the following detailed description presented in connection with the accompanying drawings, in which.

DESCRIPTION

DEFINITION:

The following definitions apply to specific terms used in describing cutting elements discussed below:

Non-linear: a characteristic of a structure with a continuous surface and whose cross section does not lie in any one plane.

Non-planar: a characteristic of a structure whose surface does not lie in a single plane.

Involute: A curve formed by a path of a point on a straight line, called the generatrix, as it rolls along a convex base curve which is generally a circle.

THE NON-LINEAR, NON-PLANAR INTERFACE

Figure 1A:
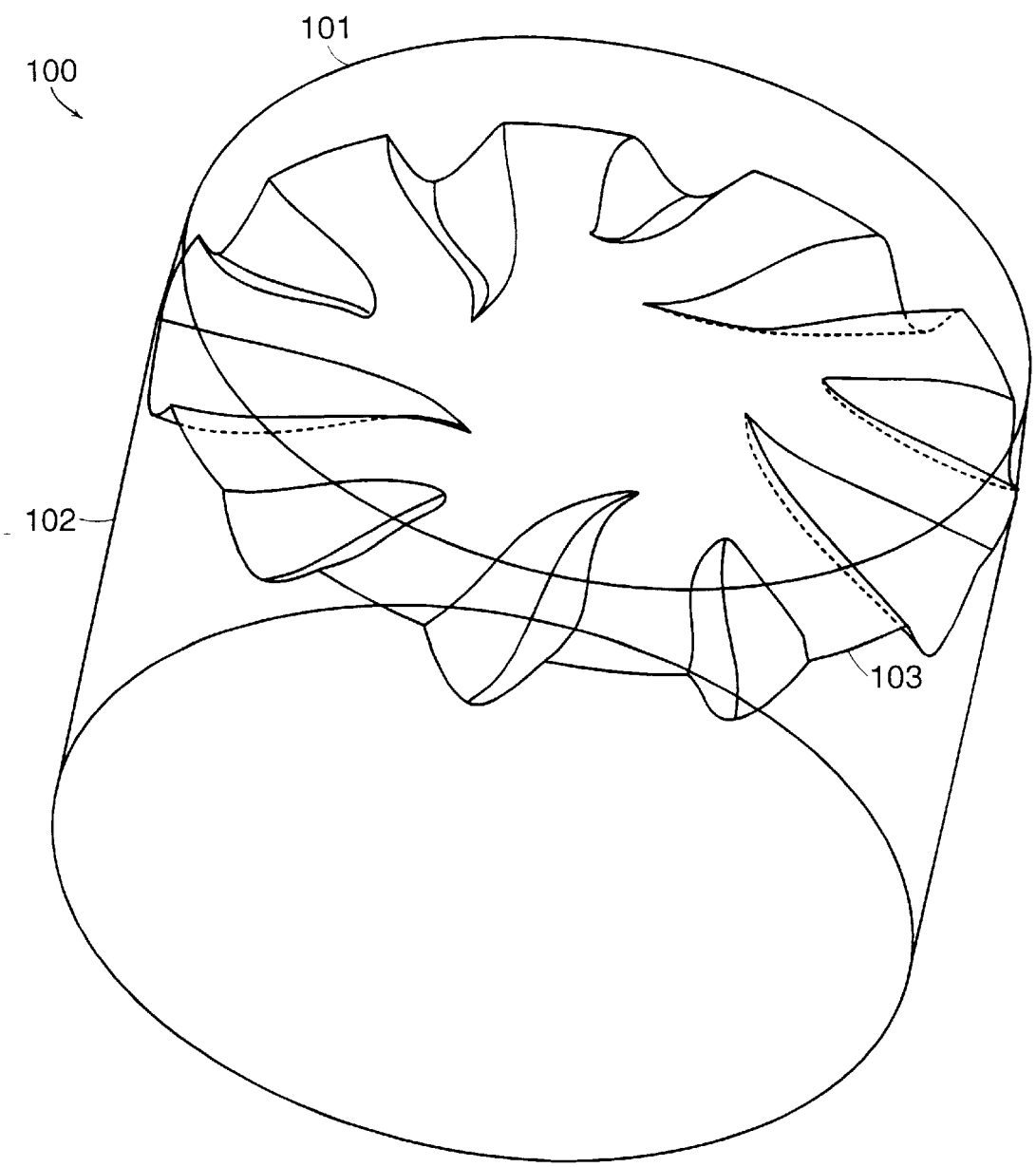
FIG. 1A is a perspective view illustrating a PCD cutting element.
Figure 1B:
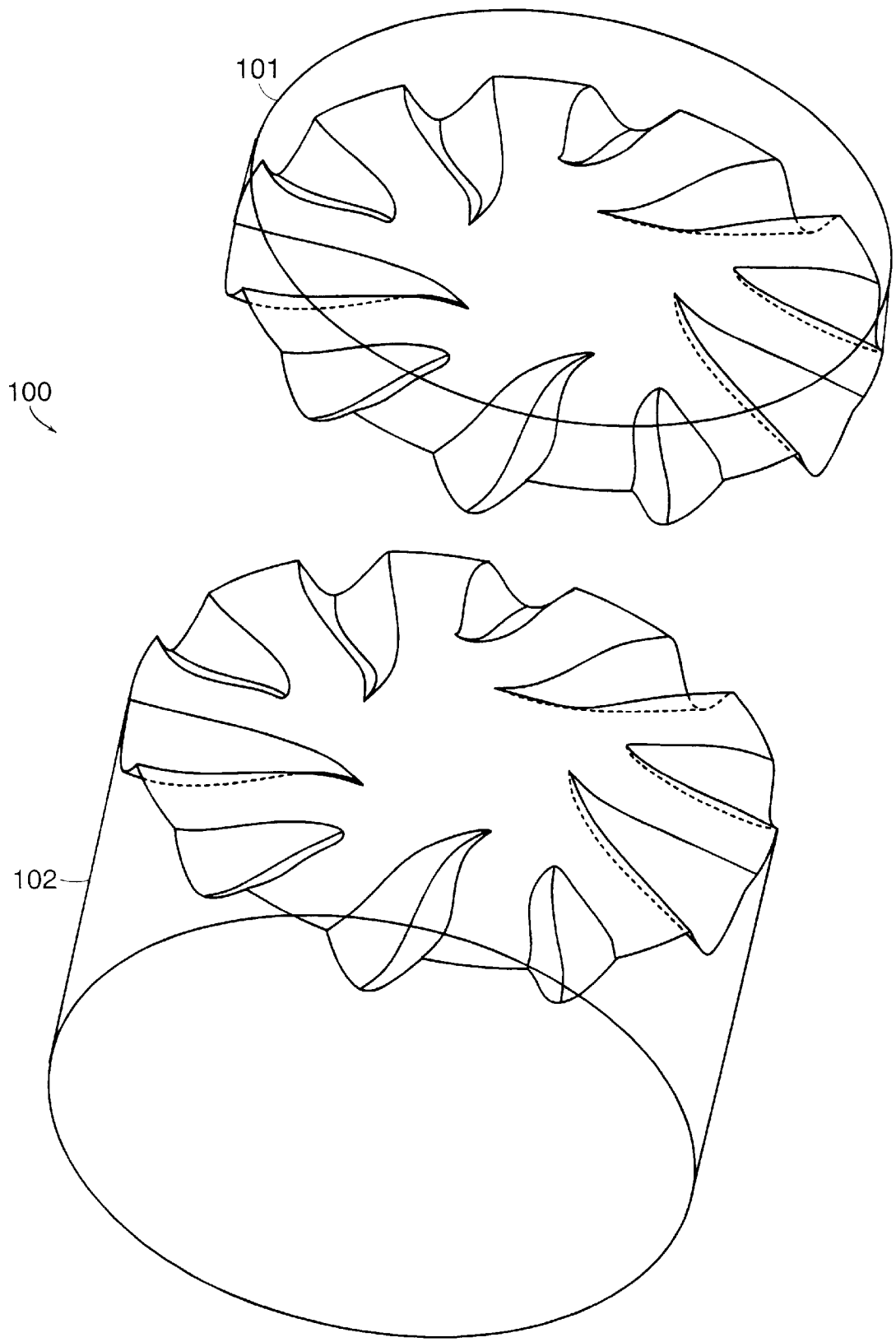
FIG. 1B is an exploded view illustrating the PCD cutting element of FIG. 1A.

Turning now to the drawings, FIG. 1A illustrates a composite cutting element 100. The cylindrical element 100 has a superhard portion 101 and a substrate portion 102. The superhard portion 101 may be a PCD compact, and the substrate portion 102 may be a tungsten carbide substrate. An interface 103 exists between the superhard portion 101 and the substrate portion 102. The interface 103 may be concave, convex, curved or any other complex shape. An exploded view of the compact 100 of FIG. 1A is shown in FIG. 1B.

Figure 2:
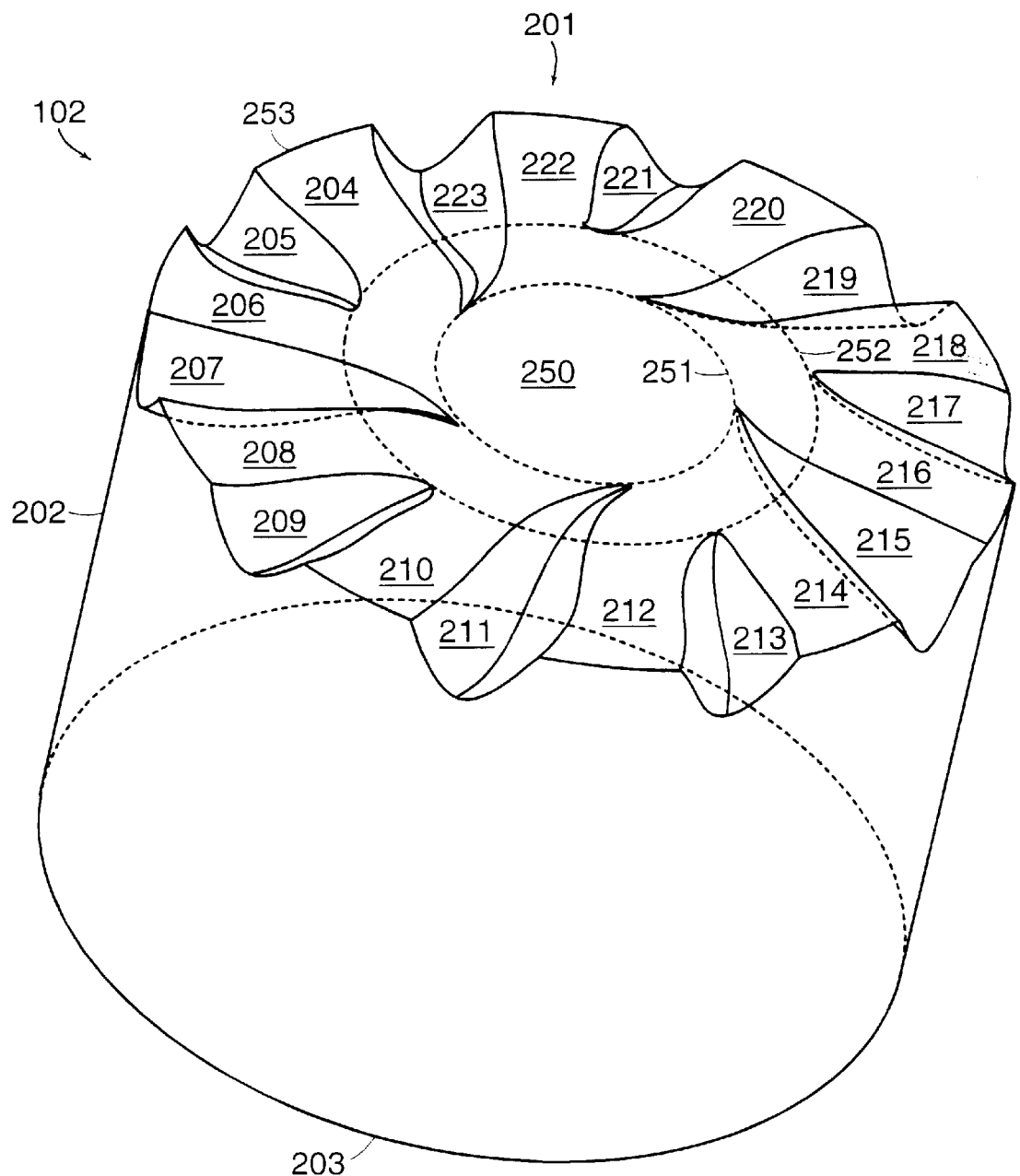
FIG. 2 is a perspective view of a substrate of FIG. 1A.

A more detailed illustration of the substrate 102 is shown in FIG. 2. The substrate 102 has a top surface 201, a cylindrical surface 202 and a bottom surface 203. Mounted on the top surface 201 are a plurality of NPI-NLI grooves 205, 207, 209, 211, 213, 215, 217, 219, 221 and 225. Positioned between these grooves are blades 204, 206, 208, 210, 212, 214, 216, 218, 220 and 222 respectively. In this embodiment, the NPI-NLI grooves 205, 209, 213, 217, and 221 form a first set of grooves which are symmetrical in relation to each other, while the NPI-NLI grooves 207, 211, 215, 219 and 223 from a second set of grooves that are symmetrical in relation to each other. Moreover, each edge 230 of NPI-NLI grooves 205, 207, 209, 211, 213, 215, 217, 219, 221 and 223 has a fillet (not shown).

The NPI-NLI grooves 207, 211, 215, 219 and 223 have tips positioned on an imaginary circle 251 on the top surface 201. These grooves expand to a periphery of the substrate 102. Moreover, each of the NPI-NLI grooves 207, 211, 215, 219 and 223 has a cross-section with a 3-D, non-linear path mathematically defined as a high order polynomial or alternatively an involute shape. A representative cross-section profile of each of the NPI-NLI grooves 207, 211, 215, 219 and 223 is shown in more detail in FIG. 5A, while a representative non-linear, 3D path of each of the NPI-NLI blades 207, 211, 215, 219 and 223 is shown in more detail in FIG. 6A. The involute profile is shown in FIG. 5C.

Analogously, the NPI-NLI grooves 205, 209, 213, 217, and 221 have tips positioned on an imaginary circle 252 on the top surface 201 and which expand to a periphery of the substrate 102. Moreover, each of the NPI-NLI grooves 205, 209, 213, 217 and 225 has a cross-section with a 3-D, non-linear path mathematically defined as a high order polynomial or alternatively an involute shape. The cross-section profile of each of the NPI-NLI grooves 205, 209, 213, 217, and 221 is shown in more detail in FIG. 5B, while the non-linear, 3D path of each of the NPI-NLI grooves 207, 211, 215, 219, and 223 is shown in more detail in FIG. 6B. It is to be understood that the representative profiles and paths of FIGS. 5A, 5B, 6A and 6B are for illustration purposes only and that the specific equations in FIGS. 5A, 5B, 6A and 6B do not limit the scope of the claims.

Figure 3:
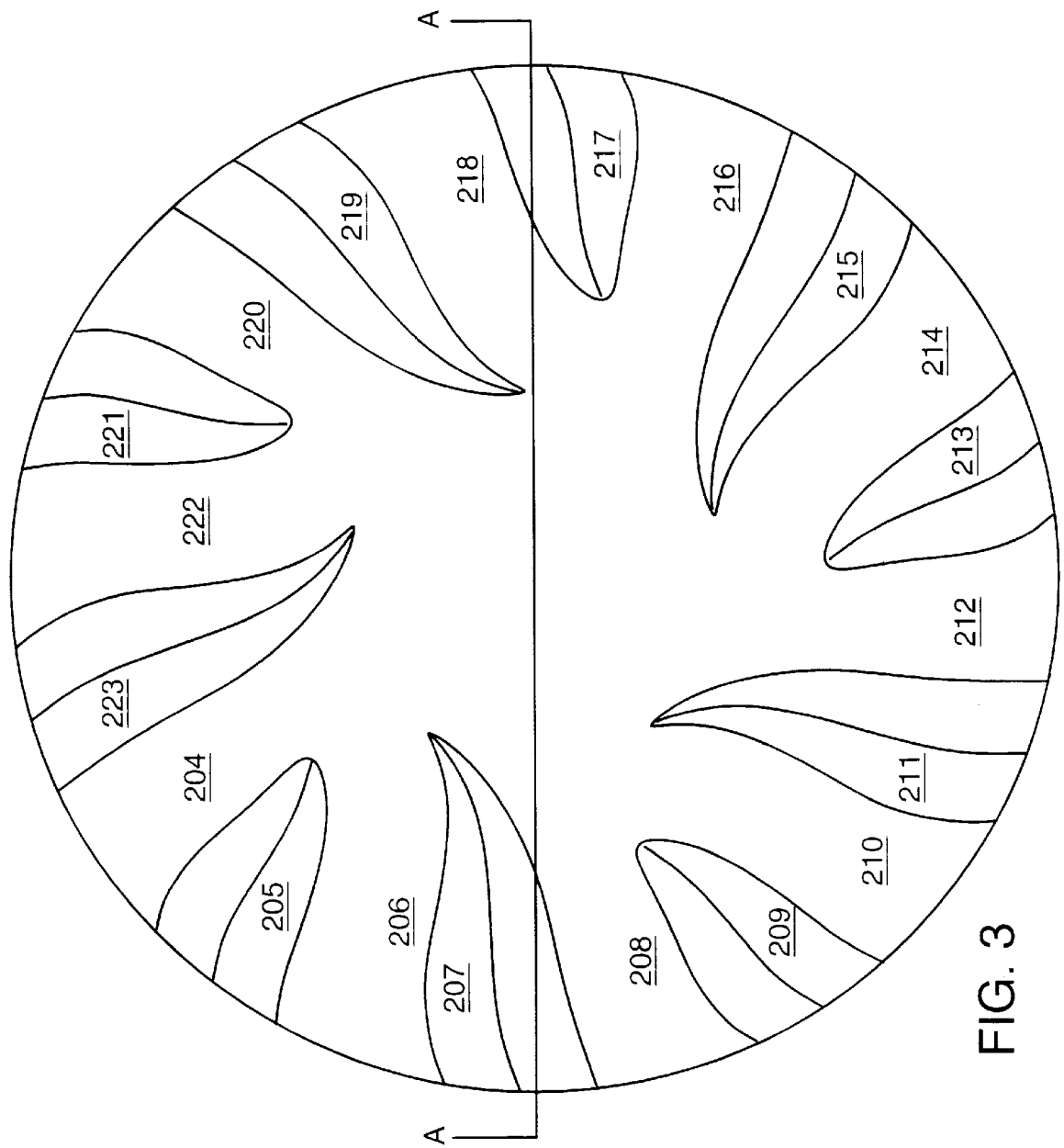
FIG. 3 is a top view of the substrate of FIG. 2.

A top view of the surface 201 and blades mounted thereon is shown in FIG. 3. As shown, the NPI-NLI grooves 205, 207, 209, 211, 213, 215, 217, 219, 221 and 223 form blades 204, 206, 208, 210, 212, 214, 216, 218, 220 and 222, respectively. Moreover, the second set of grooves 207, 211, 215, 219 and 221 extends more toward the center of the substrate 102 than the first set of grooves 205, 209, 213, 217, 221. The blades in one group are interleaved with the blades in the other group so that the combined blade sequence becomes 205, 207, 209, 211, 213, 215, 217 and 219, 221 and 223. The depth, size and path of adjacent grooves are different, but the depth, size and path of alternate grooves are the same. In this manner, more space for bonding is achieved, without unnecessarily overcrowding and reducing the integrity of the surface of the substrate 201.

Focusing in on the exemplary blade 214, from its tip, the blade 214 unfurls toward the perimeter of the substrate 102. Generally, the tip, side and base of the blade 215 has smooth shapes defined by grooves 215 and 213 to avoid sharp transitions which may increase the stress within the cutting element during operation.

A width W of the blade 214, as measured between its sides generally increases as the blade 214 unfurls toward the perimeter of the substrate 102. Additionally, a depth D of the blade 214 also increases as the blade 214 unfurls. Hence, the blade width and depth generally increase from the center of the substrate 102 to provide more surface area to receive the superhard material when they are bonded to the tungsten carbide substrate 102. A pitch angle is also varied as a function of a radius, a curvature, and a cord of the blade 214 across the substrate 102, thus imparting a turbine blade like appearance to the surface of the substrate 102.

The process for creating a groove profile is an iterative process. Generally, a set of points are specified to dimensionally define a profile of the groove. A curve is drawn for example using a "trend line" function in an Excel spreadsheet that closely fits the curve to the points defined. Usually a high order polynomial equation is used for the curve. The co-efficients of the equation are adjusted to get a best fit to defined points, and to satisfy certain end-point conditions. The final equation is used to generate a 2-D non-linear profile of the groove.

The non-linear path of the groove is formed in a similar manner. A set of x-y and x-z points are specified to describe the non-linear path, and curves are generated to fit the points. The equations for the curves are adjusted to obtain the best fit to the points, as well as to satisfy certain end-point conditions. The final equations in x, y and z coordinates are used to generate a non-planar, non-linear path of the groove.

Figure 4:
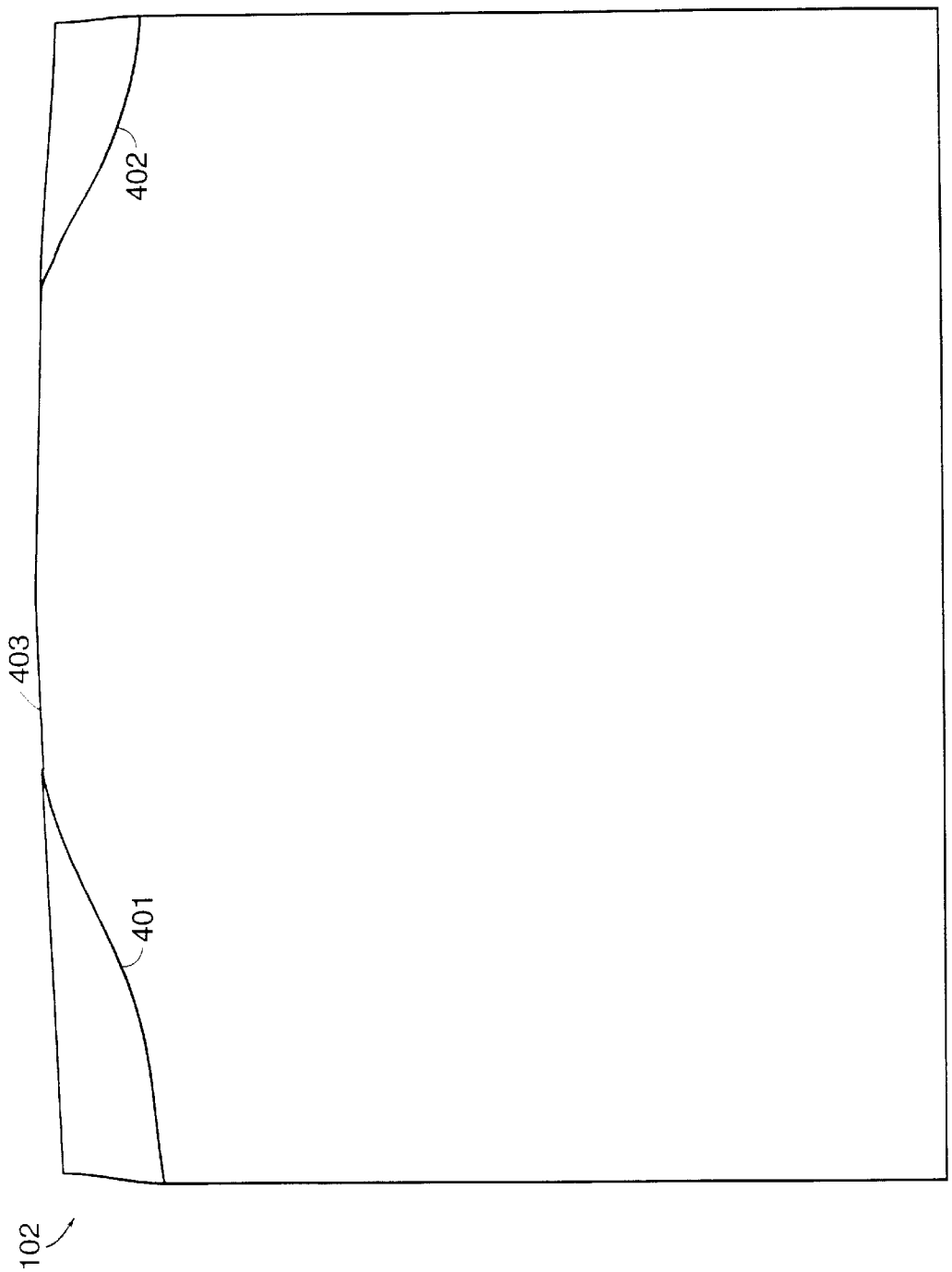
FIG. 4 is a cross-sectional view of the substrate of FIG. 2, as cut along line A—A of FIG. 2.

FIG. 4 shows a side, cross-sectional view of the substrate 102, as cut along lines A—A (FIG. 3). The substrate 102 has a top 403 that formed a non-linear profile shown in FIG. 7 and non-linear paths 401 and 402 which unfurl from the top 403 toward the perimeter of the substrate 102.

The radial, sloped blade paths 401 and 402 of FIG. 4 support greater diamond thickness in both the radial and circumferential directions of the cutting element. This geometry provides improved wear life by virtue of greater diamond thickness on the perimeter of the cutter and greater impact strength by virtue of increased bonded surface area between the diamond substrate layers and scattering of Herzian energy imparted during severe cutting conditions.

During manufacturing, a liquid phase sintering process is performed on the substrate 102 and the superhard portion 101 (FIGS. 1A and 1B) at a high temperature and a high pressure. The high pressure is required to maintain the polycrystalline diamond under stable thermodynamic conditions during the liquid phase sintering. Further, a layer of metallic additive may be provided at the interface 103 between the substrate 102 and the superhard layer 101 to enhance the bonding process.

Figure 5A:
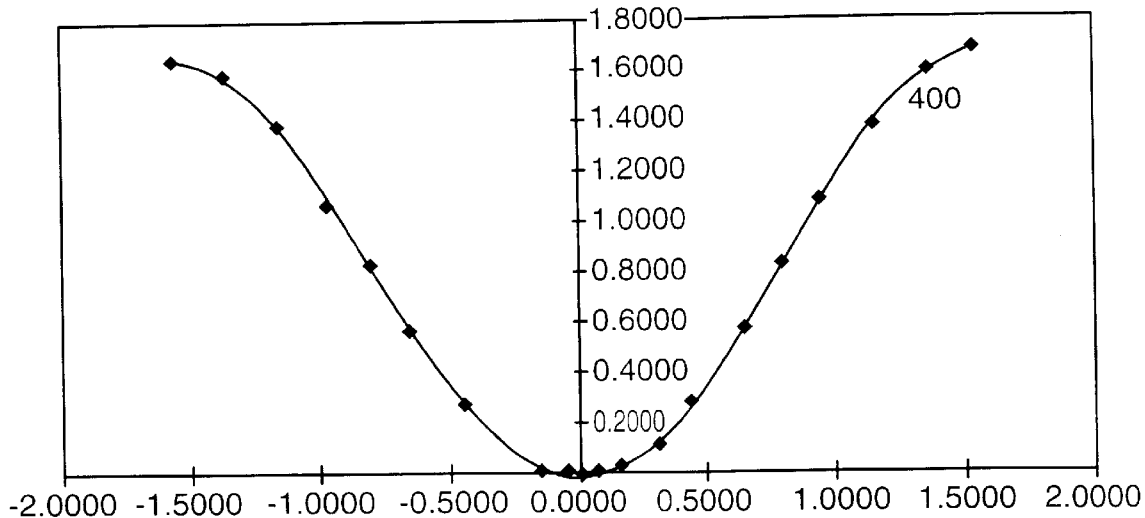
FIGS. 5A and 5B are profiles of grooves on the substrate.
Figure 5B:
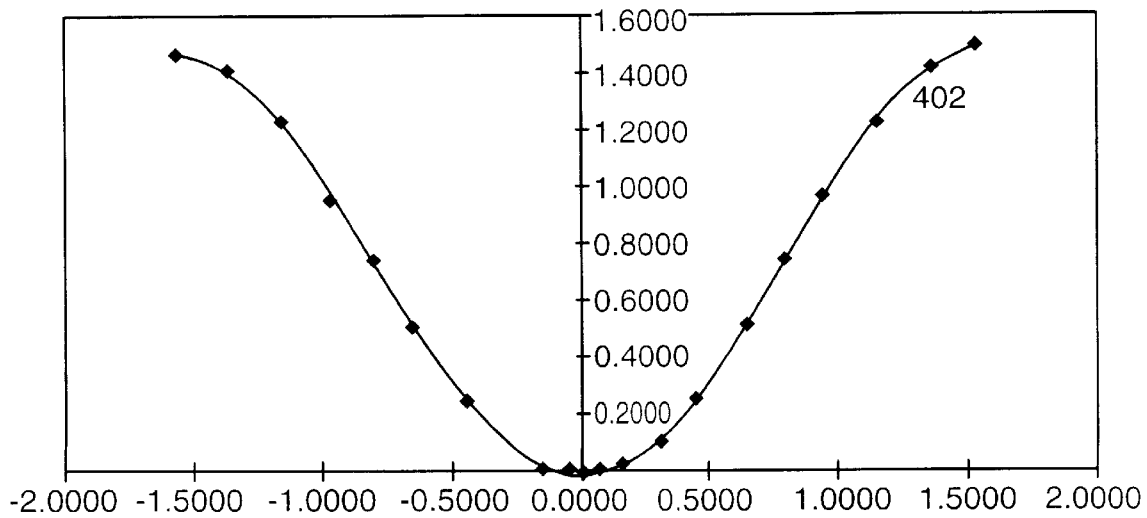
Figure 5C:
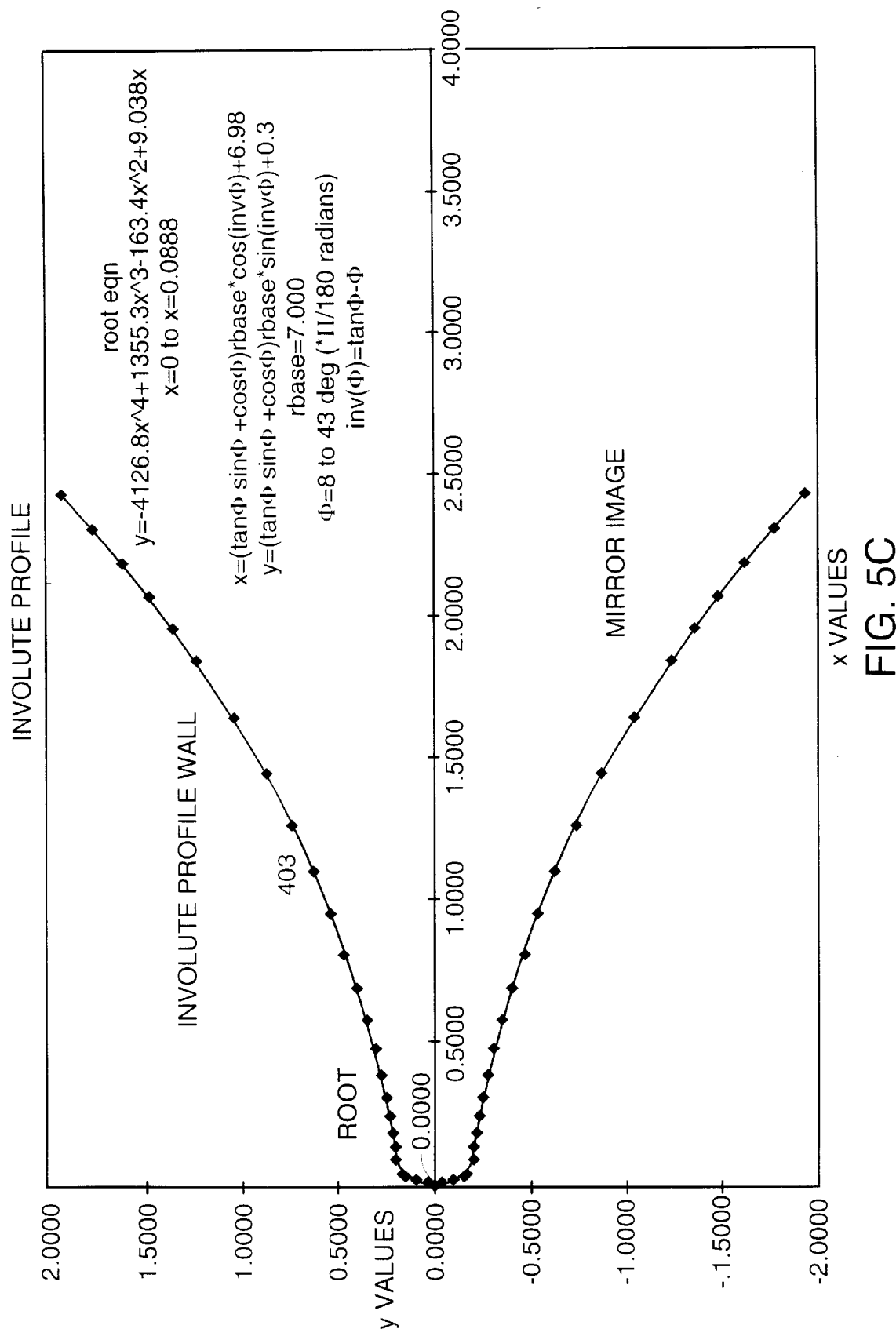
FIG. 5C illustrates an involute profile for the groove.
Figure 6A:
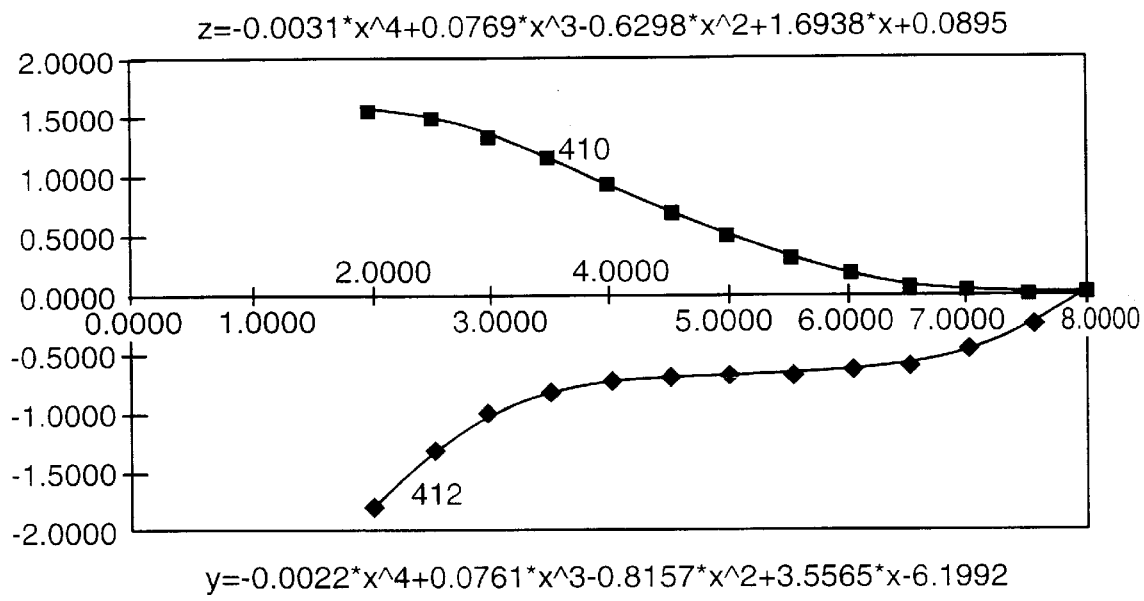
FIGS. 6A and 6B illustrate paths of the groove.

Turning now to FIGS. 5A, 5B, 5C, 6A and 6B, exemplary illustrations of iterative processes to arrive at equations describing the profile and the path of a groove in the first set of grooves are shown. In FIG. 5A, a set of points that dimensionally define one half of the profile of the groove is plotted as an input curve. A fitted curve is drawn using the trend line function that closely fits the points defined. A fourth order polynomial equation is used for the curve in this example. The coefficients of the equation are adjusted to get the best fit to the defined points, and to satisfy certain end conditions. The final equation is used to generate a 2-D non-linear profile of the grooves. The resulting equation which forms one-half of the cross section is mirrored to generate a composite equation describing one full cross section of the groove which is plotted as a curve 400. For FIG. 5A, the groove profile equation is:

$$y=0.034x^4+0.9553x^3+2.4448x^2+0.3001x+0.0124$$

A similar process is used to generate a profile for one of the grooves in the other set. The profile is shown as a curve 402. For FIG. 5B, the groove profile equation is:

$$y=0.2003x^4+0.2968x^3+1.6602x^2+0.1847x+0.0124$$

FIG. 5C illustrates an involute profile for the groove. The involute profile is also arrived at using the iterative process to generate the curve of FIG. 5A. For FIG. 5C, the groove profile equations for one-half of the profile is:

$$y=4126.8x^4+1335.3x^3-163.4x^2+9.038x$$

where $0 \leq x \leq 0.0888$
$x=(\tan\theta\sin\theta+\cos\theta)\text{rbase}\pm\cos(\text{inv}\theta)-6.98$
$y=(\tan\theta\sin\theta+\cos\theta)\text{rbase}\pm\cos(\text{inv}\theta)+0.2$
rbase=7.000
($\theta$=8 to 43 deg. ($\pi$/180 radians)
$\text{inv}\theta\tan\theta-\theta$ Similarly, groove paths for grooves in the first and second sets are arrived at as curves 410, 412, 414 and 416 in FIGS. 6A and 6B. For FIG. 6A, the groove profile equations are:

$$y=0.0022x^4+0.0762x^3-0.8157x^2+3.5565x-6.1992$$

$$z=0.0031x^4+0.0769x^3-0.6298x^2+1.6938x+0.0895$$

Figure 6B:
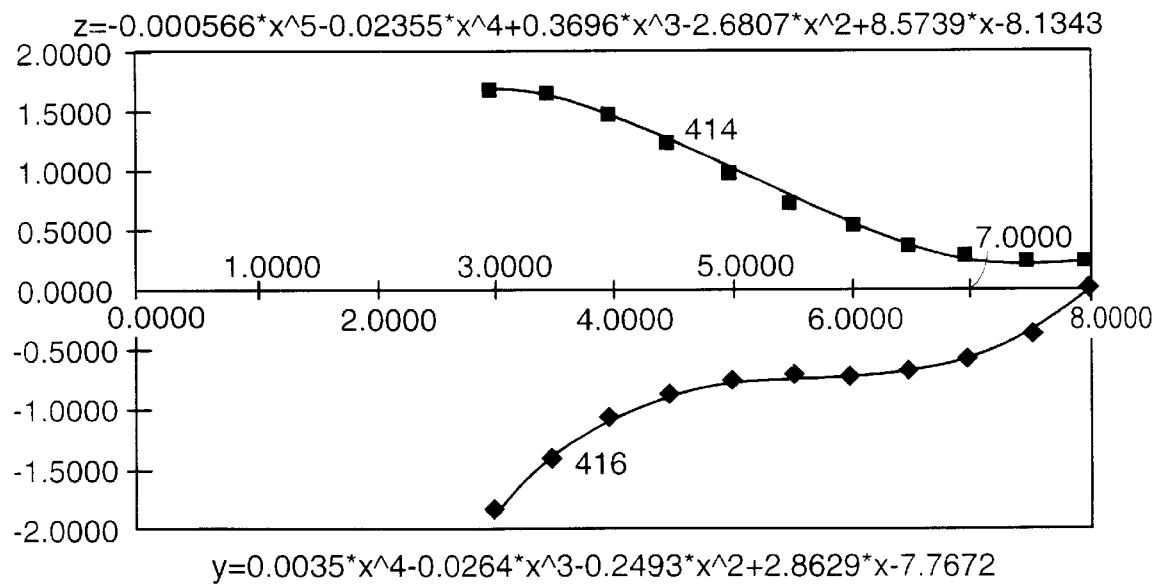

For FIG. 6B, the groove profile equation is:

$$y=0.0035x^4+0.0264x^3-0.2493x^2+2.8629x-7.7672$$

$$z=0.000566x^5-0.02355x^4+0.3696x^3-2.6808x^2+8.5739x-8.1343$$

Figure 7:
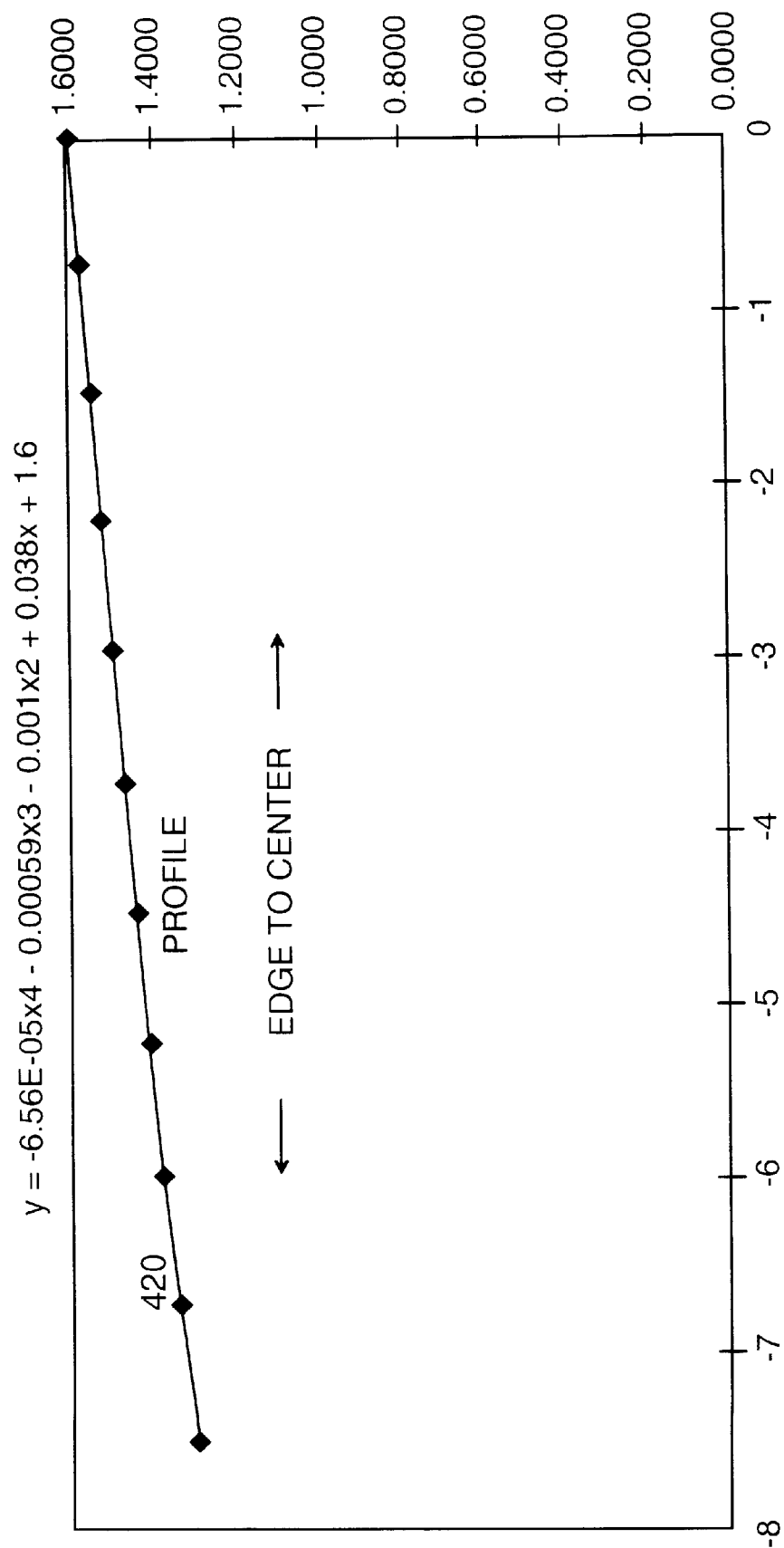
FIG. 7 illustrates a contour of a top surface of the substrate.

Additionally, a contour of the top surface of the substrate 102 is arrived at using a similar process, as shown in a curve 420 of FIG. 7. For FIG. 7, the groove profile equation is:

$$y=-6.56e^{-5}x^4-0.00059x^3-0.001x^2+02038x+1.6$$

It is to be noted that these equations are for illustrative purposes only, and the claims are not to be limited to these exemplary equations describing the non-planar, non-linear profile and path of the grooves.

In the process of "capping" or cutting the top profile of the substrate 102, the initial cap is specified in x and y coordinates which define a curvature or profile of the top of the substrate 102. A curve is then drawn using the trend line function that closely fits the points defined. A fourth order polynomial equation is used for the curve. The co-efficients of the equation are adjusted to get the best fit to the defined points, and to satisfy certain end conditions. The final equation is used to generate a profile of the cap.

Figure 8:
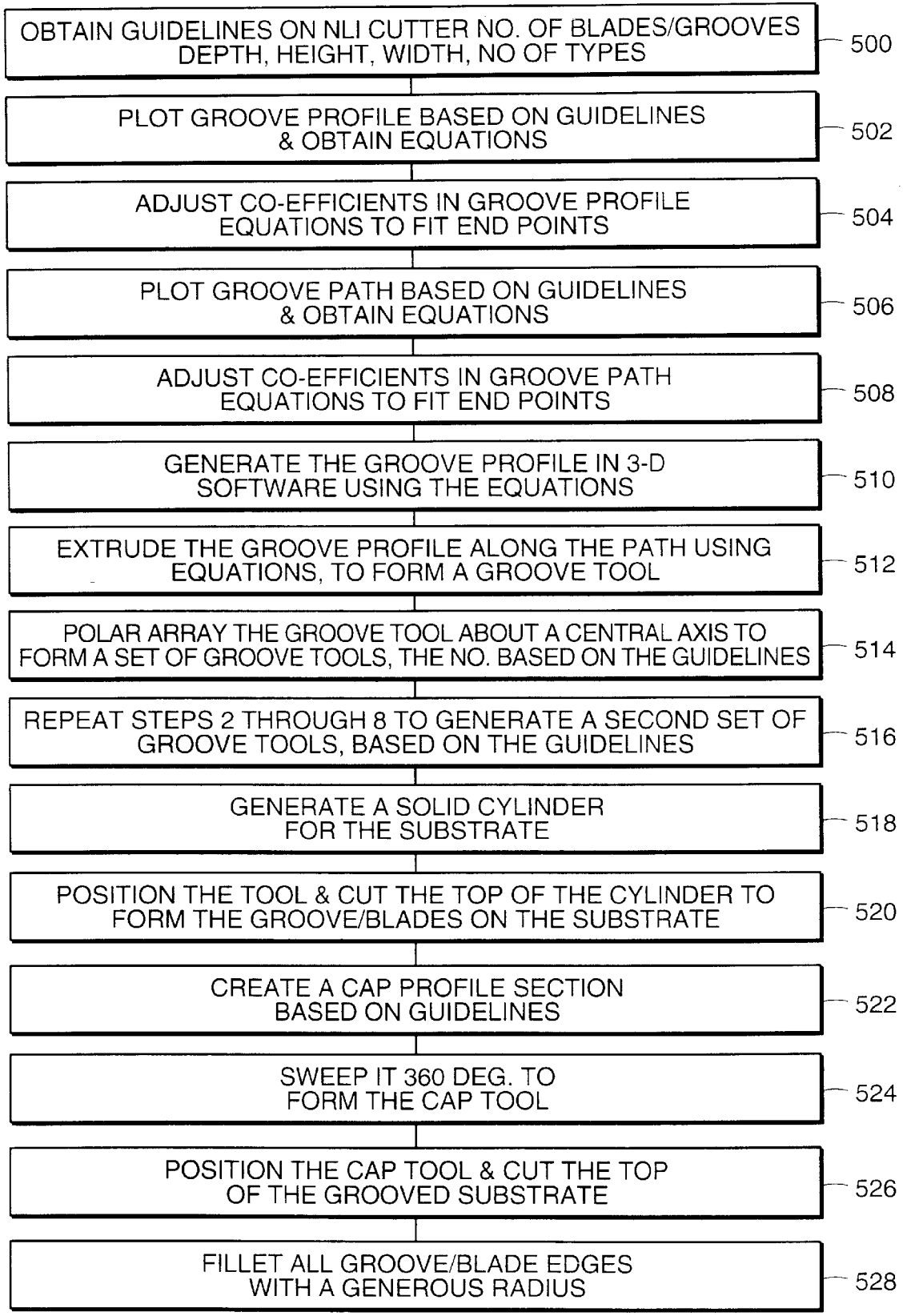
FIG. 8 is a flow chart illustrating a process of generating and optimizing high order polynomial equations describing the shape of a groove.

The process for creating the substrate structure is shown in FIG. 8. First, guidelines on the cutting element is ascertained, including the number of blades, number of grooves, the types of grooves or blades, and dimensions on depth, height, width, among others (step 500). Next, groove profiles are generated, based on the guidelines of step 500 and equations describing the profiles are generated (step 502). The equations may be high order polynomial equations. The co-efficients in groove profile equations are then adjusted to fit end points (step 504). The groove paths are plotted based on the guidelines, and equations describing the paths are generated (step 506). In this step, x-y and x-z paths for each groove are graphed and trend lines of high order polynomials are generated. The y and z points are recalculated in x increments and adjusted to match end conditions. These co-efficients in groove path equations are updated to fit end points (step 508). The groove profile in 3-D are generated using the equations (step 510). Next, the groove profiles are extruded along the path using the generated equations to form a groove tool (step 512). The groove tool is placed in a polar array about a central axis to form a set of groove tools, the number of tools being based on the guidelines (step 514).

Steps 502–514 are repeated to generate a second set of groove tools from the guidelines (step 516). A solid cylinder is generated for the substrate (step 518). Next, the tool is positioned and the top of the cylinder is cut to form the grooves and blades on the substrate (step 520). A cap profile section is then created, based on the guidelines (step 522), and swept 360 degrees to form a cap tool (step 524). The cap tool is positioned to cut the top of the grooved substrate (step 526). Finally, fillets are placed all groove/blade edges with a large radius (step 528).

Figure 9:
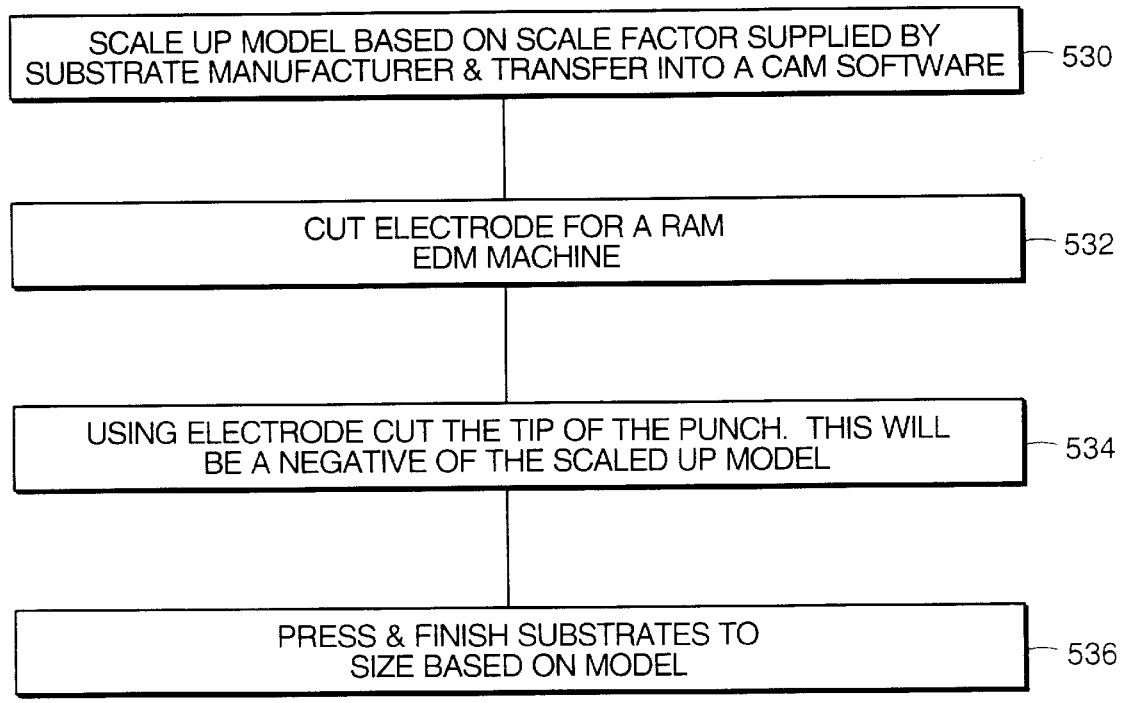
FIG. 9 is a flow chart illustrating a substrate manufacturing process.

Turning now to FIG. 9, a process for manufacturing the substrate is shown. First, a model of the substrate as created using the process of FIG. 8 is used to scale up the model by a scale factor supplied by a substrate manufacturer. The model is transferred into a computer aided manufacturing software (step 530).

Next, electrodes for a ram electro-discharge machine (EDM) machine are cut (step 532). Using the electrodes, a tip of a punch is cut to form a negative of the scaled up model (step 534). The substrates are then pressed using the punch and finished to size based on a model (step 536). As the geometry of the cutter is directly downloaded to the EDM machine, highly complex & irregular shapes may be used for the cutter substrates. The solid models of the cutter may be used for finite element analysis work as well.

Figure 10A:
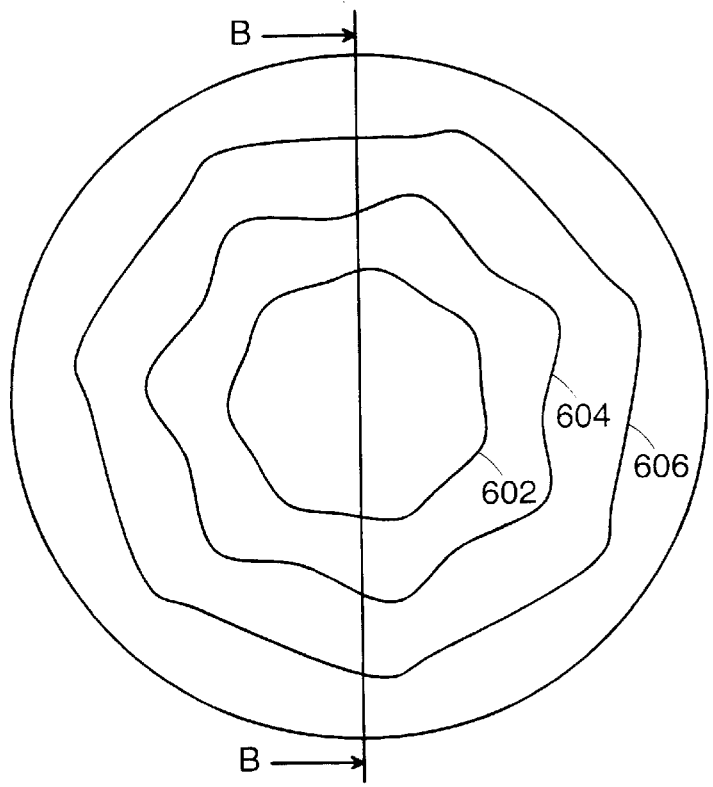
FIG. 10A is a top view of a second substrate.
Figure 10B:
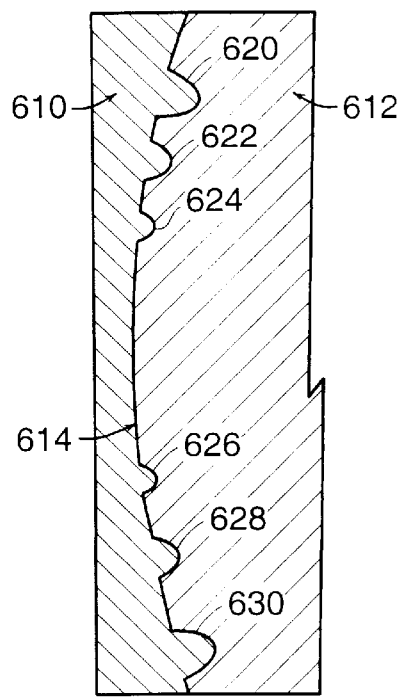
FIG. 10B is a cross sectional view of the substrate of FIG. 10A.

Turning now to FIGS. 10A and 10B, views of a second cutting element 600 are shown. FIG. 10A shows a front view of the second cutting element 600 with one or more inner grooves 602, 604 and 606. Each of inner grooves 602, 604 and 606 has a polygonal groove path with seven angles and seven sides, although any other suitable number of angles and sides may be used. Large fillets are provided to render the top surface of a substrate 612 (FIG. 10B) a continuous, non-linear, undulating surface that is symmetric about the center of the cutting element 600. Moreover, each of inner grooves 602, 604 and 606 are radially shifted with respect to each other so that a cross section of the cutting element 600 is asymmetrical.

FIG. 10B is a cross sectional view of the cutting element 600, as cut along line B—B. The cutting element 600 has a superhard layer 610, a substantially curved substrate 612 with a substantially curved interface 614. The curved substrate 612 has a plurality of angled groove projections 620–630. The groove projections 620–630 are parts of the inner grooves 602–606, respectively. Due to the radially rotated inner grooves 602–606, the cutting element 600 has an asymmetrical cross-section.

Although the non-planar, non-linear substrate has been shown with specific numbers of grooves that form blades, any number of blades or grooves with similar or dissimilar profiles, depths, heights, pitch, paths and fillets may be used, including those of U.S. patent application Ser. No. 08/921,778, entitled "ABRASIVE CUTTING ELEMENT WITH INCREASED PERFORMANCE," filed on Sep. 2, 1997 by John T. Devlin, hereby incorporated by reference. The blades may be centrally positioned or may be non-symmetrical or offset from the center of the substrate. Moreover, other non-linear patterns may be used to form such grooves, ridges, blades, or highly irregular shapes, an open flower, a happy face, or veins on a leaf.

It is to be understood that the above-described arrangements are only illustrative of an application of the present invention. Any modifications and alternative arrangements may be devised by those skilled in the art without departing from the spirit and scope of the present invention and the appended claims are intended to cover such modifications and arrangement.

What is claimed is:

1. A cutting element, comprising:
   an abrasive layer;
   a base bonded to the abrasive layer, the base having a non-linear surface with a first set of non-planar, non-linear grooves concentrically formed on the surface, each of the non-planar, non-linear grooves having a non-linear wall, where a vertical cross-section of the base is asymmetrical.

2. The cutting element of claim 1, further comprising a second set of grooves concentrically formed on the surface, wherein each of the first and second grooves are alternatingly positioned on the non-linear surface.

3. The cutting element of claim 1, wherein the non-linear surface has a shape which is specified by a complex function.

4. The cutting element of claim 1, wherein the non-linear groove has varying depths and wherein the depth of the non-linear groove at the center of the base is different than the depth of the groove at the perimeter of the base.

5. The cutting element of claim 1, wherein each of the non-linear grooves has a shape defined by an involute.

6. The cutting element of claim 1, wherein each of the non-linear grooves is sloped.

7. The cutting element of claim 1, further comprising a substantially flat cap coupled to the grooves.

8. The cutting element of claim 7, wherein each non-linear groove has a shape defined by high-order polynomial expressions.

9. The cutting element of claim 1, wherein each non-linear groove has varying widths, depths and pitches.

10. The cutting element of claim 8, wherein the widths and depths of each groove vary toward a perimeter of the non-linear surface.

11. A cutting bit, comprising;
    a body; and
    a plurality of cutters bonded to the body, each cutter including a base having a non-linear surface; and a first set of non-planar, non-linear grooves concentrically formed on the surface, each of the non-planar, non-linear grooves having a non-linear wall, where a vertical cross-section of the base is asymmetrical.

12. The cutting bit of claim 11, further comprising a second set of grooves concentrically formed on the non-linear surface, wherein each of the first and second grooves is alternatingly positioned on the surface.

13. The cutting bit of claim 11, wherein each of the non-linear grooves has varying depths.

14. The cutting bit of claim 11, wherein each of the grooves has a shaped defined by an involute or a high order polynomial.

15. The cutting bit of claim 11, wherein each cutter further comprises:
   an abrasive layer; and
   a metallic additive layer positioned between the base and the abrasive layer.

16. The cutter of claim 11, wherein the substrate and the table are sintered bonded together.

17. A method for forming a cutting element having one or more non-planar, non-linear grooves on a surface of the cutting element, the method comprising:
   specifying an initial profile of the groove;
   generating a high order polynomial expression representative of the initial profile;
   adjusting one or more co-efficients of the high order polynomial expression to satisfy predetermined end conditions; and
   generating the cutting element using the high order polynomial expression.

18. The method of claim 17, further comprising generating a non-linear path for the groove.

19. The method of claim 17, further comprising generating a profile of the cap.

20. The method of claim 17, further comprising:
   specifying an initial profile of the groove in a second plane;
   generating a second high order polynomial equation fitting the initial profile with respect to the second plane; and
   adjusting the co-efficients of the equation to satisfy certain end conditions; and
   generating a non-planar, non-linear profile of the groove from the second high order polynomial equations.

21. A cutting element, comprising:
   an abrasive layer;
   a base bonded to the abrasive layer, the base having a non-linear surface with a first set of non-planar, non-linear projections concentrically formed on the surface, each of the non-planar, non-linear projections having a non-linear wall, where a vertical cross-section of the base is asymmetrical.

22. A method for forming a cutting element having one or more non-planar, non-linear projections on a surface of the cutting element, the method comprising:
   specifying an initial profile of the one or more projections;
   generating a high order polynomial expression representative of the initial profile;
   adjusting one or more coefficients of the high order polynomial expression to satisfy predetermined end conditions; and
   generating the cutting element using the high order polynomial expression.

* * * * *